US010336032B2

(12) United States Patent
Hannig (10) Patent No.: US 10,336,032 B2
(45) Date of Patent: Jul. 2, 2019

(54) METHOD FOR PRODUCING A PRINTING MATERIAL AND A DIRECTLY PRINTED DECORATIVE PANEL (71) Applicant: SURFACE TECHNOLOGIES GMBH & CO. KG, Kaisersesch (DE)

(72) Inventor: Hans-Jürgen Hannig, Bergisch Gladbach (DE)

(73) Assignee: Surface Technologies GMBH & Co. KG, Baruth (DE)

(*) Notice: Subject to any disclaimer, the term of this patent is extended or adjusted under 35 U.S.C. 154(b) by 302 days.

(21) Appl. No.: 14/440,816

(22) PCT Filed: Dec. 5, 2013

(86) PCT No.: PCT/EP2013/075627
§ 371 (c)(1),
(2) Date: May 5, 2015

(87) PCT Pub. No.: WO2014/102046
PCT Pub. Date: Jul. 3, 2014

(65) Prior Publication Data
US 2015/0298426 A1 Oct. 22, 2015

(30) Foreign Application Priority Data

Dec. 28, 2012 (EP) ..................................... 12199682
Jul. 24, 2013 (EP) ..................................... 13177791

(51) Int. Cl.
B32B 5/02 (2006.01)
B32B 38/00 (2006.01)
(Continued)

(52) U.S. Cl.
CPC ............. *B32B 5/022* (2013.01); *B32B 27/10* (2013.01); *B32B 27/12* (2013.01); *B32B 29/002* (2013.01);
(Continued)

(58) Field of Classification Search
None
See application file for complete search history.

(56) References Cited

U.S. PATENT DOCUMENTS 2,035,760 A 3/1936 Reese
4,473,613 A * 9/1984 Jaisle ...................... B32B 29/06
156/307.1
(Continued)

FOREIGN PATENT DOCUMENTS

DE 102007019851 A1 4/2007
DE 102007019851 A1 * 10/2008 ............. B32B 27/04
(Continued)

OTHER PUBLICATIONS

Machine-generated English translation of DE 102007019851; Oct. 2008.*
(Continued)

Primary Examiner — Michael P. Rodriguez
(74) Attorney, Agent, or Firm — Stinson LLP (57) ABSTRACT Method for producing a printing substrate for direct printing onto a decorative panel, comprising the steps of providing a plate-shaped carrier; applying a resin layer onto the plate-shaped carrier; applying a paper or non-woven fabric layer onto the plate-shaped carrier; and calendering the resulting layered structure at a temperature between ≥40° C. and ≤250° C.; wherein after the calendering process a resin composition is applied, which comprises between ≥0.5 wt.-% and ≤85 wt.-% of a solid material having a mean grain diameter d50 between ≥0.1 μm and ≤120 μm.

22 Claims, 2 Drawing Sheets (51) Int. Cl.
*B32B 27/10* (2006.01)
*B32B 27/12* (2006.01)
*B32B 29/00* (2006.01)
*B44C 5/04* (2006.01)

(52) U.S. Cl.
CPC .............. *B32B 38/145* (2013.01); *B44C 5/04* (2013.01); *B32B 2307/75* (2013.01); *B32B 2451/00* (2013.01); *B32B 2471/00* (2013.01); *B32B 2607/00* (2013.01)

(56) References Cited

U.S. PATENT DOCUMENTS

| | | | |
|---|---|---|---|
| 7,431,979 B2 | 10/2008 | Grafenauer | |
| 8,366,854 B2 | 2/2013 | Buhlmann | |
| 9,174,423 B2 | 11/2015 | Buhlmann | |
| 9,272,568 B2 | 3/2016 | McDonnell et al. | |
| 2004/0027433 A1* | 2/2004 | Stork | B41M 5/52 347/100 |
| 2007/0027733 A1 | 2/2007 | Bolle et al. | |
| 2008/0227348 A1* | 9/2008 | Waller | B32B 5/26 442/59 |
| 2010/0055420 A1 | 3/2010 | Vermeulen | |
| 2012/0301639 A1 | 11/2012 | Grigorenko et al. | |

FOREIGN PATENT DOCUMENTS

| | | | |
|---|---|---|---|
| EP | 1749676 A1 | 2/2007 | |
| EP | 2386408 A2 | 11/2011 | |
| EP | 2749413 B1 | 5/2016 | |
| JP | 2000170361 A | 6/2000 | |
| JP | 2006212549 A | 8/2006 | |
| JP | 2011230499 A | 11/2011 | |
| WO | 2008110254 A1 | 9/2008 | |
| WO | 2008122668 A1 | 10/2008 | |
| WO | WO 2008/131811 A1 * | 11/2008 | ............. B32B 29/06 |
| WO | 2010121971 | 10/2010 | |
| WO | 2011064162 A2 | 6/2011 | |

OTHER PUBLICATIONS

European Search Report, EP2386408 A3, dated Jan. 19, 2012, 3 pages.
Abstract DE 102007019851A1.
International Search Report issued in PCT/EP2013/075627, dated Mar. 5, 2014, 6 pages.
International Preliminary Report on Patentability, PCT/EP2013/075627, dated Jun. 30, 2015, 7 pages.
Written Opinion, PCT/EP2013/075627, dated Mar. 18, 2014, 7 pages.

* cited by examiner

METHOD FOR PRODUCING A PRINTING MATERIAL AND A DIRECTLY PRINTED DECORATIVE PANEL

REFERENCE TO RELATED APPLICATIONS

This application is a U.S. national stage application of International Patent Application No. PCT/EP2013/075627, filed Dec. 5, 2013, and claims the benefit of priority of European Application No. 13177791.4, filed Jul. 24, 2013 and European Application No. 12199682.1 filed Dec. 28, 2012, the entire disclosures of which are incorporated herein by reference.

FIELD OF THE INVENTION

The present invention relates to a method for producing a printing substrate for direct printing on a decorative panel. Moreover, the present invention relates to a decorative panel comprising a printing substrate produced according to a method according to the invention. The present invention in particular relates to a method for producing a directly printed decorative panel without backing layer and a decorative panel without backing layer produced according to a method according to the present invention.

BACKGROUND

The term "decorative panel" in the sense of the invention means wall, ceiling or floor panels comprising a decor applied onto a carrier plate. Decorative panels are used in a variety of ways both in the field of interior design of rooms and for decorative cladding of buildings, for example in exhibition stand construction. One of the most common uses of decorative panels is their use as a floor covering. Herein, the decorative panels often comprise a decor intended to replicate a natural material.

Examples of such replicated natural materials are wood species such as maple, oak, birch, cherry, ash, walnut, chestnut, wenge or even exotic woods such as Panga Panga, mahogany, bamboo and bubinga. In addition, often natural materials such as stone surfaces or ceramic surfaces are replicated.

Heretofore, such decorative panels are often produced as laminates, in which a decorative paper pre-printed with a desired decor is applied onto a carrier plate and in turn a so-called overlay is applied onto the decorative paper. In order to avoid a deformation of the decorative panels, the so-called cupping, by shrinkage effects of the applied decorative paper, subsequently a backing paper is applied onto the side of the carrier plate opposite to the decorative paper and the layered structure obtained is firmly bonded together using appropriate pressure and/or heat-activated adhesives. Herein, the forces acting onto the carrier plate by the backing layer should counteract the tensile forces caused by the cupping.

Herein, the application of the backing layer requires a further process step and, thus, increased production costs.

In dependence of the desired field of application of these decorative panels they can be made of different materials. Herein, in particular, the material of the carrier can be selected depending on the field of application. Thus, the carrier may for example consist of a wood-based material, provided the decorative panels are not exposed to excessive moisture or weather conditions. However, if the panel is intended to be used, for example, in wet rooms or outdoors, the carrier may for example consist of a plastic material.

Wood-based materials in the sense of the invention in addition to solid wood materials are materials such as cross-laminated timber, glue-laminated timber, blockboard, veneered plywood, laminated veneer lumber, parallel strand lumber and bending plywood. In addition, wood-based materials in the sense of the invention are also chipboards such as pressboards, extruded boards, oriented structural boards (OSB) and laminated strand lumber as well as wood fiber materials such as wood fiber insulation boards (HFD), medium hard and hard fiberboards (MB, HFH) and in particular medium density fiberboards (MDF) and high density fiberboards (HDF). Even modern wood-based materials such as wood polymer materials (wood plastic composite, WPC), sandwich boards made of a lightweight core material such as foam, rigid foam or honeycomb paper and a layer of wood applied thereto, and minerally hardened, for example with cement, chipboards are wood-based materials in the sense of the invention. Moreover, cork represents a wood-based material in the sense of the invention.

Plastic materials which can be used for producing corresponding panels are, for example, thermoplastic plastic materials such as polyvinyl chloride, polyolefines (such as polyethylene (PE), polypropylene (PP)), polyamides (PA), polyurethanes (PU), polystyrene (PS), acrylonitril butadiene styrene (ABS), polymethyl methacrylate (PMMA), polycarbonate (PC), polyethylene terephthalate (PET), polyether ether ketone (PEEK) or mixtures or co-polymerizates thereof. The plastic materials can include common fillers, such as calcium carbonate (chalk), aluminum oxide, silicagel, quartz powder, wood flour, gypsum. In addition they can be coloured in a known way.

The term "direct printing" in the sense of the invention means the application of a decor directly onto the carrier of a panel or onto an unprinted fiber material layer applied to the carrier. In contrast to the conventional methods in which a decorative layer previously printed with a desired decor is applied onto the carrier, in direct printing the decor is printed directly in the course of the surface coating or the panel manufacturing process. Here, different printing techniques such as flexographic printing, offset printing or screen printing may be used. In particular digital printing techniques such as inkjet processes or laser printing can be used.

In the sense of the invention the term fiber materials means materials such as paper and non-woven fabrics on the basis of plant, animal, mineral or even synthetic fibers as well as cardboards. Examples are fiber materials on the basis of plant fibers and, in addition to papers and non-woven fabrics made of cellulose fibers, boards made of biomass such as straw, maize straw, bamboo, leaves, algae extracts, hemp, cotton or oil palm fibers. Examples of animal fiber materials are keratin-based materials such as wool or horsehair. Examples of mineral fiber materials are mineral wool or glass wool.

For protecting the applied decorative layer normally wearing or top layers are applied on top of the decorative layer. A wearing and/or top layer in the sense of the invention is a layer applied as an outer border which in particular protects the decorative layer from wear or damage caused by dirt, moisture and mechanical impacts such as abrasion.

It is often intended that in such a wearing or top layer a surface structure matching with the decor is introduced. A surface structure matching with the decor means that the surface of the decorative panel has a haptically perceivable structure which with respect to its shape and pattern corresponds to the applied decor in order to achieve a reproduction of a natural material as close to the original as possible even with respect to the haptic.

A problem which may occur during direct printing of decorative panels is that the surface of the decorative panel to be printed is no optimal printing substrate onto which a corresponding decor can be applied. Here, the problem is that a paper or non-woven fabric layer applied as a printing substrate onto a carrier plate of a decorative panel is penetrated by the resin used for the application such that the resin applied for fixing penetrates through on the side of the paper or non-woven fabric intended to be printed and can cause adhesion problems of the printing ink there. To overcome this problem, the paper or non-woven fabric may be provided with a barrier layer that prevents the penetration of the resin through the paper or non-woven fabric. However, such a barrier layer often brings about that the ink applied in the printing process does not or not sufficiently settle into the paper or non-woven fabric, but remains on the surface, which adversely affects the quality of the print. Furthermore, it can be provided that the paper or non-woven fabric is provided with an ink receiving layer on the side to be printed prior to the application onto the carrier plate, and then the ink receiving layer is printed. The decorative paper thus prepared is then applied onto the carrier plate. However, during the subsequent application of a top or wearing layer adhesion problems can be caused, so that the final composite laminate has no sufficient stability and, for example, splitting of the laminate in the decorative paper layer is caused.

SUMMARY OF THE INVENTION

Thus it is an object of the present invention to provide a method for producing a printing substrate for direct printing onto a decorative panel, which is able to overcome the problem known in the prior art. Moreover, it is an object of the present invention to provide a decorative panel with a corresponding printing substrate. In particular, it is an object of the present invention to provide a method for producing a directly printed decorative panel without backing layer and to provide a corresponding decorative panel without backing layer.

These objects are achieved by a method according to claim 1 and a decorative panel according to claim 14. Embodiments of the invention are provided in the dependent claims and in the further description.

DETAILED DESCRIPTION OF PREFERRED EMBODIMENTS

Thus, according to the present invention a method for producing a printing substrate for direct printing onto a decorative panel is proposed, comprising the steps:
 a) providing a plate-shaped carrier;
 b) applying a resin layer onto the plate-shaped carrier;
 c) applying an unprinted paper or non-woven fabric layer onto the plate-shaped carrier; and
 d) calendering the laminate structure obtained at a temperature between $\geq 40°$ C. and $\leq 250°$ C., characterized in that after the calendering process a resin composition is applied including between $\geq 0.5$ wt.-% and $\leq 85$ wt.-%, preferably between $\geq 1.0$ wt.-% and $\leq 80$ wt.-% of a solid material having a mean grain diameter $d_{50}$ between $\geq 0.1$ μm and $\leq 120$ μm, preferably between $\geq 1$ μm and $\leq 100$ μm.

It has surprisingly been found that the application of a printing substrate with a corresponding solid material content after calendering an unprinted paper or non-woven fabric layer is adapted to provide a surface excellently suitable for a subsequent direct printing process, which, moreover, also has a very good adherence with respect to a subsequently applied top or wearing layer, so that a laminate produced by use of the method according to the present invention has a high stability. Herein, the specified solid material content of the resin composition refers to the liquid resin composition. According to the invention it may be in particular provided that the resin composition applied after the calendering process penetrates into the applied paper or non-woven fabric layer at least partially to the extent that the resin composition penetrates through up to the plate-shaped carrier or the resin layer applied thereon. Furthermore, it has surprisingly been found that by means of such a production method the application of a backing layer to avoid cupping of the decorative panel can be dispensed with. This leads to significant economic benefits because on the one side the need for a corresponding process step is eliminated and on the other side corresponding material savings can be achieved.

Herein, the printing substrate provided according to the present invention is suited for flexographic printing, offset printing or screen printing as well as for digital printing techniques such as inkjet processes or laser printing.

According to one embodiment of the method a resin composition is applied after calendering of the paper or non-woven fabric layer onto the plate-shaped carrier, which comprises as a solid material at least one compound of the group consisting of titanium dioxide, barium sulfate, barium oxide, barium chromate, zirconium (IV) oxide, silica, aluminum hydroxide, aluminum oxide, iron oxide, iron (III) hexacyanoferrate, chromium oxide, cadmium oxide, cadmium sulfide, cadmium selenite, cobalt doxide, cobalt phosphate, cobalt aluminate, vanadium oxide, bismuth vanadium oxide, tin oxide, copper oxide, copper sulfate, copper carbonate, lead antimonate, lead chromate, lead oxide, lead carbonate, calcium carbonate, calcium sulfate, calcium aluminate sulfate, zinc oxide, zinc sulfide, arsenic sulfide, mercury sulfide, carbon black, graphite, cellulose fibers or mixtures thereof. By using such solid materials in particular a coloured printing substrate can be provided the colouring of which has a property supporting the decor printing process. For example, in a decorative design which is to represent a dark wood species, a printing substrate with a brown or brownish base tone should be applied, while in a decorative design that is to represent a light wood species or light-colored stone, a printing substrate with a yellow or white base tone should be applied. The use of cellulose fibers in the resin composition applied to the plate-shaped carrier has, in particular, the beneficial effect that any irregularities on the carrier plate surface onto which the resin composition is applied have no impact on the surface to be printed later, resulting in a significant improvement of the print image. Such irregularities may, for example, be grinding grooves resulting from grinding of the carrier plates or impressions caused by conveyor means, such as conveyor belts, etc. When cellulose fibers are used they preferably have a grain size in the range between $\geq 10$ μm and $\leq 100$ μm, in particular between $\geq 25$ μm and $\leq 90$ μm. The proportion of the cellulose fibers in the solid material included in the resin composition may, for example, be in a range between ≥0 wt.-% and ≤100 wt.-%., preferably between ≥40 wt.-% and ≤100 wt.-%, in particular between ≥60 wt.-% and ≤100 wt.-%. Here, the preferred proportion of solid materials in the resin composition in the case of using cellulose fibers is at the lower end of the wt.-% range, preferably between 0.5 wt.-% and 3.5 wt.-%, in particular between 1.0 wt.-% and 2.5 wt.-%, whereas the preferred proportion of solid materials in the resin composition listed as suitable examples of other solid materials is preferably between ≥5 wt.-% and ≤85 wt.-%, preferably ≥10 wt.-% and ≤80 wt.-%, more preferably between ≥35 wt.-% and ≤75 wt.-%. This is particularly due to the low specific weight of the cellulose fibers which can be added as solid material compared to the specific weight of the other solid materials listed.

In particular, it can be provided according to the present invention that after the calendering process a resin composition is applied, which includes at least one organic or inorganic pigment selected from the group consisting of Prussian blue, brilliant yellow, cadmium yellow, cadmium red, chromium oxide green, cobalt blue, cobalt coelin blue, cobalt violet, irgazine red, iron oxide black, manganese violet, phthalocyanine blue, sienna, titanium white, ultramarine blue, ultramarine red, umber, kaolin, zirconium silicate pigments, monoazo yellow and monoazo orange, thioindigo, beta-naphthol pigments, naphthol AS pigments, pyrazolone pigments, Nacetoacetanilide pigments, azo metal complex pigments, diaryl yellow pigments, quinacridone pigments, diketopyrrolo-pyrrole pigments (DPP), dioxazine pigments, perylene pigments, isoindolinone pigments, copper phthalocyanine pigments, and mixtures thereof.

According to a further embodiment of the method it may be provided that after the calendering process a resin composition is applied, which as a resin component comprises at least one compound selected from the group consisting of melamine resin, formaldehyde resin, urea resin, phenol resin, epoxy resin, unsaturated polyester resin, diallyl phthalate or mixtures thereof. It has surprisingly been found that when using a corresponding resin component in combination with the solid material content in the resin composition a printing substrate can be provided which enables a significantly improved adherence with respect to a top and/or wearing layer applied in a final step resulting in an improved stability of the laminate. Herein, the resin composition may, for example, include a resin content between ≥15 wt.-% and ≤95 wt.-%, preferably ≥20 wt.-% and ≤90 wt.-%, more preferably between ≥25 wt.-% and ≤65 wt.-%.

Furthermore, in one embodiment of the method it can be provided that after the calendering process a resin composition is applied which includes a curing agent, wherein the curing agent can be included in the resin composition, for example, at a concentration between ≥0.05 wt.-% and ≤3.0 w.-%, preferably ≥0.15 wt.-% and ≤2.0 wt.-%, more preferably between ≥0.5 wt.-% and ≤2.0 wt.-%. The provision of a curing agent in the resin composition enables to optimize the binding or curing behavior of the resin composition in dependence on the paper applied onto the plate-shaped carrier.

According to one embodiment of the method the curing agent may, for example, be a solution of organic salts. Preferably, the curing agent has an acidic pH value, preferably between pH ≥0.5 and <pH 7, more preferably >pH 0.5 and pH ≤6.

In a particularly preferred embodiment of the invention a so-called latent curing agent is used as a curing agent. Latent curing agents are characterized in that after their addition to the resin on the one hand a sufficient processing time at room temperature, and on the other hand the shortest possible curing time is achieved at the subsequent processing temperatures. The effect of the latent curing agent is based on the fact that they are ineffective at normal temperatures and release an acid only at elevated temperatures or due to a chemical reaction which accelerates the curing process. Examples of latent curing agents include alkyl or alkanolamine salts of the sulfurous acid, amidosulphonic acid, 3-chloro-1,2-propanediol, p-toluenesulfonic acid, morpholine, ammonium sulfate, ammonium chloride, ammonium sulfite, ammonium nitrate, ethanolamine hydrochloride, dimethylethanolammonium sulfite, diethanolammonium sulfamate or maleic acid.

In particular, the curing agent may be an aqueous, preferably nonionic solution. An example of a suitable curing agent is MH-180 B (Melatec AG, Switzerland).

After the calendering process the resin composition may, for example, be applied with an area density between ≥5 g/m$^2$ and ≤50 g/m$^2$, preferably ≥10 g/m$^2$ and ≤40 g/m$^2$. According to a further embodiment the resin composition can also be applied in at least two application steps.

According to a preferred embodiment of the method it may in particular be provided that after the calendering process a resin composition having a viscosity corresponding to a flow time between ≥7 s and ≤60 s from a standard flow cup is applied. The viscosity is determined in accordance with DIN 53211 using a flow cup with a discharge nozzle width of 4 mm.

After application of the resin composition subsequently to the calendering process preferably a drying step is carried out in which the surface subsequently to be printed is at least partially dried. To this end it may be provided that on the surface onto which the resin composition has been applied, a surface temperature of ≥75° C. and ≤125° C., preferably between ≥80° C. and ≤110° C., in particular between ≥90° C.≤100° C. is generated. For generating a corresponding surface temperature, for example, IR emitters, NIR emitters, jet dryers or similar devices can be used. Herein, said surface temperature is preferably set for a period between ≥1 s and ≤600 s, preferably between ≥5 s and ≤400 s, more preferably between ≥10 s and ≤300 s.

The resin composition applied after the calendering process in addition to the components mentioned above may comprise further components or additives such as rheological agents for adjusting the viscosity, water, flow improvers, preservatives, surfactants, antifoaming agents or the like.

In the method according to the invention, both the application of a resin composition onto the plate-shaped carrier as well as the application of a resin composition onto the paper or non-woven fabric applied onto the plate-shaped carrier can be implemented after the calendering process by means of application rollers, a spraying device, knife coating, blade coating, airbrushes, cast line devices, slot dies, curtain coating or other suitable devices.

According to a further preferred embodiment of the method, a curing agent is applied onto the plate-shaped carrier prior to application of the resin layer in step b). In this case, more preferably, an acidic curing agent, for example having a pH-value between pH ≥0.5 and <pH 7, preferably >pH 0.5 and ≤pH 6 is applied onto the plate-shaped carrier. The curing agent is reactive against or influences the curing reaction of the resin composition to be applied subsequently by means of which a paper or non-woven layer is to be attached to the plate-shaped carrier.

Further, it may be provided that after the application of the curing agent onto the plate-shaped carrier a heat treatment is carried out, by means of which the temperature of the surface of the plate-shaped carrier is increased, preferably to a temperature between ≥35° C. and ≤90° C. Such a heat treatment can, for example, be implemented by means of IR emitters or NIR emitters (near-infrared).

For applying the resin layer in step b) it may be preferably provided that a resin composition is applied which as a resin component comprises at least one compound selected from the group consisting of melamine resin, formaldehyde resin, urea resin, phenol resin, epoxy resin, unsaturated polyester resin, diallyl phthalate or mixtures thereof. The resin composition may, for example, be applied at an area density between ≥5 g/m$^2$ and ≤50 g/m$^2$, preferably ≥10 g/m$^2$ and ≤40 g/m$^2$. Particularly preferably, the area density of the resin composition is selected so that the paper or non-woven fabric applied in the subsequent step c) is not fully impregnated with the resin composition. To this end, for example, it may be also provided that the resin composition in step b) is applied with a kinematic viscosity corresponding to a flow time between ≥10 s and 40 s from a standard flow cup (as measured according to DIN 53211).

According to a further embodiment of the method in step c) a paper or non-woven fabric with a grammage between ≥30 g/m$^2$ and ≤80 g/m$^2$, preferably ≥40 g/m$^2$ and ≤70 g/m$^2$ is applied onto the plate-shaped carrier.

According to one embodiment of the method a backing layer is applied on the side opposite to the decorative side. Herein, it is particularly preferred that the backing layer is applied in a common calendering step with the paper or non-woven fabric onto the decorative side.

In a further embodiment of the invention it may be provided that a backing layer is applied to the side of the plate-shaped carrier opposite to the decorative layer only after the application of the decorative image. Herein, it may be particularly provided that the backing layer is applied as a top and/or wearing layer in a common step together with the application of an overlay.

However, in particular it is preferred in the context of the invention, if the application of a backing layer is dispensed with. It has been shown surprisingly that by means of such a production method the application of a backing layer can be dispensed with, while cupping of the decorative plate is avoided. This leads to significant economic benefits, because on the one side the corresponding process step can be eliminated and on the other side corresponding material savings are obtained.

After the application of the printing substrate onto the decorative side a decor can be applied by means of suitable printing techniques, wherein flexographic printing, offset printing or screen printing processes and in particular digital printing techniques such as inkjet processes or laser printing are suitable.

Preferably, a radiation curable paint and/or ink is used for applying the decorative layer by means of direct printing techniques. Radiation curable in the sense of the invention means that the paint and/or ink is cured by means of electromagnetic radiation such as UV radiation or electron beam radiation. Herein, it may be particularly provided that the paint and/or ink includes corresponding components polymerizing radiation or photo induced. Examples of suitable components are acrylates, epoxides or cyclic amines, such as ethylene imine.

In order to protect the applied decorative layer a wearing or top layer can be applied in a subsequent process step on top of the decorative layer which in particular protects the decorative layer from wear or damage caused by dirt, moisture or mechanical impacts such as abrasion. Herein, it may be provided that the wearing layer includes hard materials such as titanium nitride, titanium carbide, silicon nitride, silicon carbide, boron carbide, tungsten carbide, tantalum carbide, alumina (corundum), zirconia or mixtures thereof in order to increase the wear resistance of the layer. Herein, it may be provided that the hard material is included in the wearing layer composition in an amount between 5 wt.-% and 40 wt.-%, preferably between 15 wt.-% and 25 wt.-%. The hard material preferably has a mean grain diameter between 10 μm and 250 μm, more preferably between 10 μm and 100 μm. In this way in a preferable way it is achieved that the wearing layer composition forms a stable dispersion and a decomposition or precipitation of the hard material within the wearing layer composition can be avoided. For forming a corresponding wearing layer in one embodiment of the invention it is provided that the radiation curable composition including the hard material is applied at a concentration between 10 g/m$^2$ and 300 g/m$^2$, preferably between 50 g/m$^2$ and 250 g/m$^2$. In this case, the application can be implemented, for example, by means of rollers such as rubber rollers, or by means of pouring devices. In a further embodiment of the invention it may be provided that the hard material is not included within the wearing layer composition at the time of application of the wearing layer composition, but is scattered in the form of particles onto the applied wearing layer composition and subsequently the wearing layer is cured radiation induced.

Moreover, it can be provided that in the wearing or top layer a surface structure matching with the decor is introduced. Herein, it may be provided that the carrier plate already has a structure and an alignment of a printing tool for applying the decor with respect to the carrier plate is implemented depending on the structure of the carrier plate which is detected by means of optical methods. Herein, for aligning the printing tool and the carrier plate relative to each other it can be provided that a relative movement between the printing tool and the carrier plate necessary for the alignment is implemented by shifting the carrier plate or by shifting the printing tool. According to a further embodiment of the invention it is provided that a structuring of the decorative panels is implemented subsequently to the application of the top and/or wearing layer. To this end it may be preferred to apply a settable composition as the top and/or wearing layer and a curing process is implemented only to the extent that only a partial curing of the top and/or wearing layer is achieved. In the thus partially cured layer by means of appropriate tools, such as a hard metal texture roller or a die, a desired surface structure is embossed. Herein, the embossing process is implemented in correspondence with the applied decor. In order to ensure a sufficient correspondence of the structure to be produced with the decor it may be provided that the carrier plate and the embossing tool are aligned relative to each other by corresponding relative movements. Subsequently to the introduction of the desired structure within the partially cured top and/or wearing layer a further curing step is implemented with respect to the now structured top and/or wearing layer.

Moreover, it can be provided that the wear and/or top layer is applied as a radiation curable or at least partially radiation curable composition, for example based on an acrylic varnish, an epoxy varnish or a urethane acrylate. Herein, it may be particularly preferred that the composition after the application onto the decorative layer is only partially cured radiation induced and a surface structure matching with the decor is introduced into the partially cured layer in the manner described above.

According to a further embodiment of the invention the top and/or wearing layer can comprise means for reducing the static (electrostatic) charging of the finished laminate. For example, it may be provided that the top and/or wearing layer to this end comprises compounds such as choline chloride. Herein, the antistatic agent may, for example, be included in the composition for forming the top and/or wearing layer at a concentration between ≥0.1 wt.-% and ≤40.0 wt.-%, preferably between ≥1.0 wt.-% and ≤30.0 wt.-%.

In a further embodiment of the method according to the invention it can be provided that the structure is produced in the course of the printing process. For this purpose, it may be provided, for example, that a multiple paint application is implemented in such a way that raised areas are created on the printing substrate which result in a desired three-dimensional structure. On the structure thus produced a wearing and/or top layer can be applied.

Moreover, according to the present invention a directly printed decorative panel is proposed comprising a plate-shaped carrier, a resin layer applied onto the plate-shaped carrier, a layer of a non-impregnated and unprinted paper or non-woven fabric, a printing substrate applied to the paper or non-woven fabric layer, a paint layer applied onto the printing substrate and a top and/or wearing layer applied at least onto the paint layer, characterized in that the printing substrate is formed from a resin composition including between ≥0.5 wt.-% and ≤85 wt.-%, preferably between ≥1.0 wt.-% and ≤80 wt.-% of a solid material having a mean grain diameter $d_{50}$ between ≥0.1 μm and ≤120 μm, wherein the resin composition as a resin component comprises at least one compound selected from the group consisting of melamine resin, formaldehyde resin, urea resin, phenol resin, epoxy resin, unsaturated polyester resin, diallyl phthalate or mixtures thereof in a concentration between ≥15 wt.-% and ≤95 wt.-%, preferably between ≥20 wt.-% and ≤90 wt.-% and a curing agent in a concentration between ≥0.05 wt.-% and ≤2.0 wt.-%, preferably ≥0.15 wt.-% and ≤1.0 wt.-%.

In a preferred embodiment of the decorative panel according to the invention the panel comprises no backing layer on the side of the plate shaped-carrier opposite to the printed side. Such a panel without backing layer can be produced in particular more cost-efficiently by saving material and process steps thereby providing economic benefits in addition to environmental benefits of resource conservation.

According to another embodiment of the invention the plate-shaped carrier can comprise a profile at least in an edge region. Here, it may be in particular provided that the decor is applied also in the region of the profile, such that the profiling process is implemented prior to the application of the decorative layer onto the plate-shaped carrier. Alternatively or in addition a profiling process can be implemented subsequently to the application of the decorative layer. In profiling in the sense of the invention it is provided that by means of suitable machining tools at least in a portion of the edges of the decorative panel a decorative and/or functional profile is introduced. Here, a functional profile, for example, means the introduction of a groove and/or tongue profile in an edge in order to connect decorative panels to each other by means of the introduced profiles. A decorative profile in the sense of the invention, for example, is a chamfer formed at the edge region of the decorative panel, for example, in order to simulate a joint between two interconnected panels, such as for example in so-called wide planks.

By partially profiling the decorative panel not all profiles to be provided in the finished panel are produced, but only part of the profiles, while other profiles are produced in a subsequent step. Thus, it may be provided, for example, that the decorative profile to be provided in a panel, such as a chamfer, is produced in one step, while the functional profile, e.g. groove/tongue, is produced in a subsequent step.

By means of the application of the decor subsequently to the at least partially profiling of the carrier, for example, by means of the above-described methods, such as direct printing, abrasion or damage of the decor in the course of the profiling process can be avoided in an advantageous way. Thus, the decor also in the regions of the profile corresponds in detail to the desired imitation, for example, of a natural material.

Figure 1:
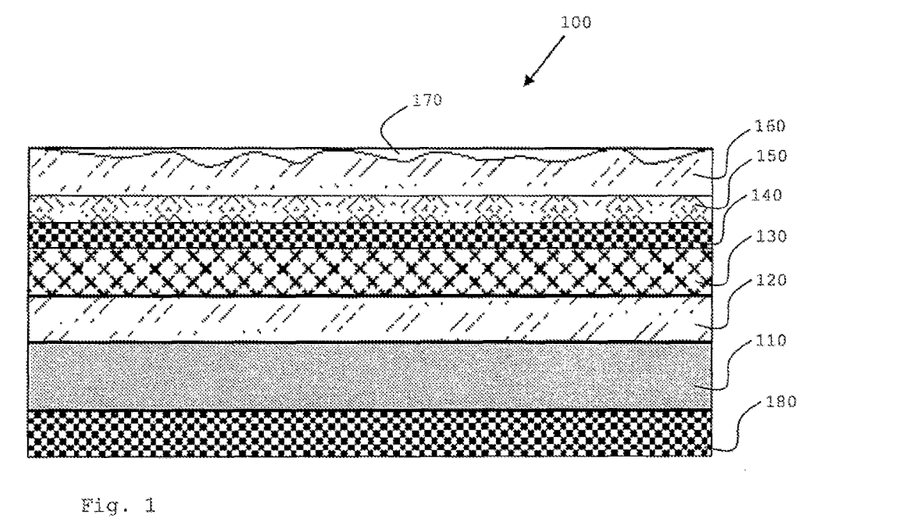
FIG. 1 shows the schematic structure of an embodiment of a decorative panel according to the invention.

FIG. 1 shows the schematic structure of an embodiment of a decorative panel 100 according to the invention. On top of a plate-shaped carrier 110, onto which first a curing agent (not shown) has been applied, a resin layer 120 is disposed by means of which a paper or non-woven fabric layer 130 can be fixed to the plate-shaped carrier 110. On top of the paper or non-woven fabric layer 130 a printing substrate 140 is applied. The printing substrate 140 is formed from a resin composition comprising between ≥0.5 wt.-% and ≤85 wt.-%, preferably between ≥1.5 wt.-% and ≤80 wt.-% of a solid material having a mean grain diameter $d_{50}$ between ≥0.1 μm and ≤120 μm. Herein, as a solid material at least one compound of the group consisting of titanium dioxide, barium sulfate, barium oxide, barium chromate, zirconium (IV) oxide, silicon dioxide, aluminum hydroxide, alumina, iron oxide, iron (III) hexacyanoferrate, chromium oxide, cadmium oxide, cadmium sulfide, cadmium selenite, cobalt oxide, cobalt phosphate, cobalt aluminate, vanadium oxide, bismuth vanadium oxide, tin oxide, copper oxide, copper sulfate, copper carbonate, lead antimonate, lead chromate, lead oxide, lead carbonate, calcium carbonate, calcium sulfate, calcium aluminate sulfate, zinc oxide, zinc sulfide, arsenic sulfide, mercury sulfide, carbon black, graphite, cellulose fibers or mixtures thereof can be included in the resin composition. Particularly preferably, the resin composition includes at least titanium dioxide or cellulose fibers as a solid material. The printing substrate 140 is applied onto the decorative panel 100 according to the invention only after a calendering step in which the paper or non-woven fabric layer 130 is pressed onto the resin layer 120 applied onto the plate-shaped carrier 110 under the action of pressure and/or heat. The resin composition of the resin layer 120 preferably penetrates only partially and not completely into the paper or non-woven fabric layer 130. Onto the printing substrate thus produced a paint layer 150 is applied, which forms a decoration. Onto the paint layer 150 a top and/or wearing layer 160 is applied. Here, the top and/or wearing layer may comprise haptically perceptual structures 170, which preferably match with the decoration formed by the paint layer 150 in a way that the impression of a natural-like material is obtained. On the opposite side a backing layer 180 is applied in the embodiment shown.

Figure 2:
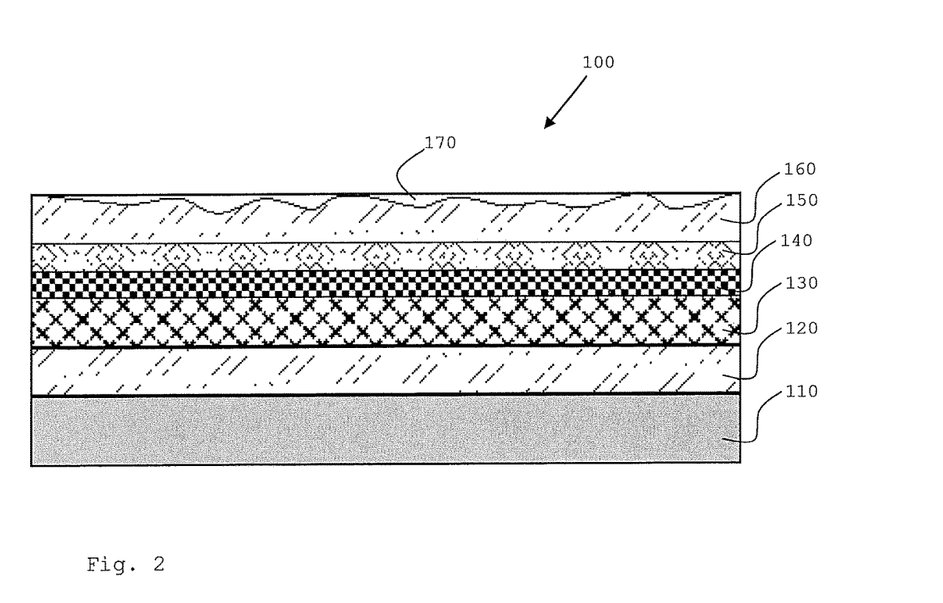
FIG. 2 shows the schematic structure of an embodiment of a decorative panel without backing layer produced according to the invention.

FIG. 2 shows the schematic structure of an embodiment of a decorative panel 100 according to the invention without a backing layer. Onto a plate-shaped carrier 110, on which first a curing agent (not shown) has been applied, a resin layer 120 is disposed by means of which a paper or non-woven fabric layer 130 can be fixed to the plate-shaped carrier 110. Onto the paper or non-woven fabric layer 130 a printing substrate 140 is applied. Herein, the printing substrate 140 is formed from a resin composition comprising between ≥1 wt.-% and ≤85 wt.-%, preferably between ≥2.5 wt.-% and ≤80 wt.-% of a solid material having a mean grain diameter $d_{50}$ between ≥0.1 μm and ≤120 μm. Herein, as a solid material at least one compound of the group consisting of titanium dioxide, barium sulfate, barium oxide, barium chromate, zirconium (IV) oxide, silicon dioxide, aluminum hydroxide, alumina, iron oxide, iron (III) hexacyanoferrate, chromium oxide, cadmium oxide, cadmium sulfide, cadmium selenite, cobalt oxide, cobalt phosphate, cobalt aluminate, vanadium oxide, bismuth vanadium oxide, tin oxide, copper oxide, copper sulfate, copper carbonate, lead antimonate, lead chromate, lead oxide, lead carbonate, calcium carbonate, calcium sulfate, calcium aluminate sulfate, zinc oxide, zinc sulfide, arsenic sulfide, mercury sulfide, carbon black, graphite, cellulose fibers or mixtures thereof can be included in the resin composition. Particularly preferably, the resin composition includes at least cellulose fibers as a solid material. The printing substrate 140 is applied onto the decorative panel 100 according to the invention only after a calendering step in which the paper or non-woven fabric layer 130 is pressed onto the resin layer 120 applied onto the plate-shaped carrier 110 under the action of pressure and/or heat. The resin composition of the resin layer 120 preferably penetrates only partially and not completely into the paper or non-woven fabric layer 130. Onto the printing substrate thus produced a paint layer 150 is applied, which forms a decoration. Onto the paint layer 150 a top and/or wearing layer 160 is applied. Here, the top and/or wearing layer can comprise haptically perceptual structures 170, which preferably match with the decoration formed by the paint layer 150 in a way that the impression of a natural-like material is obtained. In a decorative panel with such a structure an application of a backing layer is explicitly dispensed with, since it has been found that the printing substrate 140 according to the invention allows the construction of a decorative panel that even without the provision of a backing layer has no tendency of cupping, i.e. a concave surface deformation.

REFERENCE SYMBOLS 100 decorative panel
110 plate-shaped carrier
120 resin layer
130 paper/non-woven fabric layer
140 printing substrate
150 paint layer
160 top/wearing layer
170 structure
180 backing layer

The invention claimed is:

1. Method for producing a printing substrate for direct printing onto a decorative panel, comprising the steps of:
 a) providing a plate-shaped carrier;
 b) applying a resin layer onto the plate-shaped carrier;
 c) applying a paper or non-woven fabric layer onto the plate-shaped carrier to form a layered structure; and
 d) calendering the resulting layered structure at a temperature between ≥40° C. and ≤250° C.;
 e) after said calendering, applying to the layered structure a resin which comprises between ≥0.5 wt.-% and ≤85 wt.-% of a solid material having a mean grain diameter $d_{50}$ between ≥0.1 μm and ≤120 μm; and
 f) performing a drying step on the resin applied in step (e) in which a surface temperature of ≥75° C. and ≤125° C. is generated.

2. Method according to claim 1, wherein the resin composition applied after the calendering process as a solid material comprises at least one compound of the group consisting of titanium dioxide, barium sulfate, barium oxide, barium chromate, zirconium (IV) oxide, silicon dioxide, aluminum hydroxide, alumina, iron oxide, iron (III) hexacyanoferrate, chromium oxide, cadmium oxide, cadmium sulfide, cadmium selenite, cobalt oxide, cobalt phosphate, cobalt aluminate, vanadium oxide, bismuth vanadium oxide, tin oxide, copper oxide, copper sulfate, copper carbonate, lead antimonate, lead chromate, lead oxide, lead carbonate, calcium carbonate, calcium sulfate, calcium aluminate sulfate, zinc oxide, zinc sulfide, arsenic sulfide, mercury sulfide, carbon black, graphite, cellulose or mixtures thereof.

3. Method according to claim 1, wherein the resin composition applied after the calendering process includes at least one compound selected from the group consisting of melamine resin, formaldehyde resin, urea resin, phenol resin, epoxy resin, unsaturated polyester resin, diallyl phthalate or mixtures thereof.

4. Method according to claim 1, wherein the resin composition applied after the calendering process has a resin content between ≥15 wt.-% and ≤95 wt. %.

5. Method according to claim 1 wherein the resin composition applied after the calendering process comprises a curing agent in a concentration between ≥0.05 wt.-% and ≤2.0 wt. %.

6. Method according to claim 1, wherein the resin composition applied after the calendering process is applied in an area density between ≥5 g/m² and ≤50 g/m².

7. Method according to claim 1, wherein prior to the application of the resin layer onto the plate-shaped carrier in step b) a curing agent is applied onto the plate-shaped carrier.

8. Method according to claim 7, wherein the surface area of the plate-shaped carrier covered with the curing agent is heated to a surface temperature between ≥35° C. and ≤90° C.

9. Method according to claim 1, wherein in step c) a paper or non-woven fabric with a grammage between ≥30 g/m² and ≤80 g/m² is applied onto the plate-shaped carrier.

10. Method according to claim 1 further comprising the steps:
 applying a decorative layer onto the printing substrate by means of direct printing; and
 applying of a wear protection layer onto the decorative layer.

11. Method according to claim 10, wherein the decorative layer is applied by flexographic printing, offset printing, screen printing, inkjet or laser printing processes.

12. Method according to claim 10, wherein for applying the decorative layer a radiation curable paint and/or ink is applied onto the paper or non-woven fabric layer.

13. Method according to claim 1 further comprising applying an at least partially radiation curable composition as a top and/or wear layer.

14. Method according to claim 1 wherein the resin composition applied after the calendering process forms an ink receiving layer suitable for direct printing.

15. Method according to claim 2 wherein the resin composition applied after the calendering process forms an ink receiving layer suitable for direct printing.

16. Method according to claim 3 wherein the resin composition applied after the calendering process forms an ink receiving layer suitable for direct printing.

17. Method according to claim 7 wherein the resin composition applied after the calendering process forms an ink receiving layer suitable for direct printing.

18. Method according to claim 10 wherein the resin composition applied after the calendering process forms an ink receiving layer suitable for direct printing.

19. Method according to claim 11 wherein the resin composition applied after the calendering process forms an ink receiving layer suitable for direct printing.

20. Method according to claim 13 wherein the resin composition applied after the calendering process forms an ink receiving layer suitable for direct printing.

21. The method according to claim 1 wherein IR emitters or NIR emitters are used to perform the drying.

22. The method according to claim 1 wherein jet dryers are used to perform the drying.

* * * * *